US007293976B2

(12) United States Patent
La Sorda

(10) Patent No.: US 7,293,976 B2
(45) Date of Patent: Nov. 13, 2007

(54) SINGLE STATION THERMO-FORMING MACHINE

(76) Inventor: Franco La Sorda, Via Garigliano 19, Pescara (IT) 65100

( * ) Notice: Subject to any disclaimer, the term of this patent is extended or adjusted under 35 U.S.C. 154(b) by 391 days.

(21) Appl. No.: 11/105,343

(22) Filed: Apr. 14, 2005

(65) Prior Publication Data

US 2006/0233908 A1    Oct. 19, 2006

(51) Int. Cl.
B29C 51/20    (2006.01)
(52) U.S. Cl. .............. 425/340; 425/342.1; 425/384; 425/387.1
(58) Field of Classification Search .............. 425/384, 425/387.1, 388, 403, 340, 342.1
See application file for complete search history.

(56) References Cited

U.S. PATENT DOCUMENTS

| 6,450,793 | B1 * | 9/2002 | De Nichilo | 425/73 |
| 2004/0178543 | A1 * | 9/2004 | Fitzell, Jr. | 264/545 |

FOREIGN PATENT DOCUMENTS

| DE | 3410960 A1 * | 10/1985 |
| EP | 1 080 869 A1 | 3/2001 |
| EP | 1 138 464 A2 | 10/2001 |

* cited by examiner

Primary Examiner—James P. Mackey
Assistant Examiner—Seyed Masoud Malekzadeh
(74) Attorney, Agent, or Firm—Sughrue Mion Pllc.

(57) ABSTRACT

A thermo-forming machine is described for forming three-dimensional work pieces, having extensive relatively thin surfaces of uniform thickness, from flat sheets of a thermo-plastic material. The machine includes one or two molds (31, 131) movable vertically between a passive lowered position and a raised forming position, a lower, pressurizable sealed chamber (14) closed at the top by a horizontal reduction plate (12) having a first and a second aperture (12a, 12b), spaced horizontally and of a size enabling a mold (31, 131) to pass through them. First and second counter-frames (29, 30) each hold a sheet to be formed around the apertures (12a, 12b) of the reduction plate (12). Three heating panels (16, 17, 22) are provided, aligned vertically, spaced from each other and movable horizontally between a first position aligned vertically with the first aperture (12a) and a second position aligned vertically with the second aperture (12b). The upper heating panel (16) and the intermediate heating panel (17) are positioned above the reduction plate (12) for preheating opposite surfaces of a flat sheet supported between these two panels (16, 17). The lower heating panel (22) is positioned beneath the reduction plate (12) for simultaneously heating from beneath another sheet held around one of the apertures (12a, 12b) and heated from above by the intermediate panel (17).

7 Claims, 3 Drawing Sheets

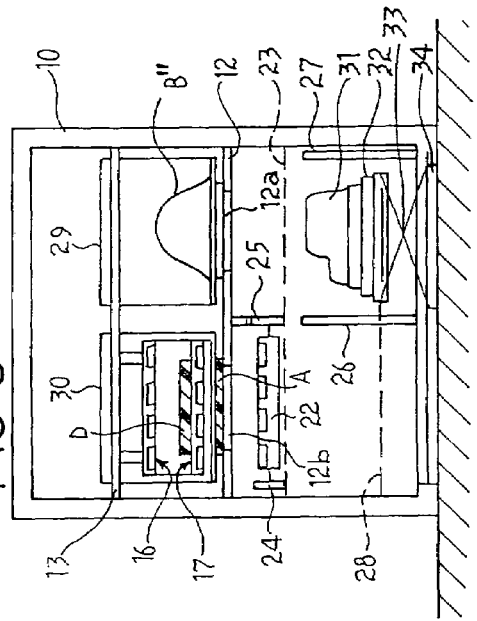
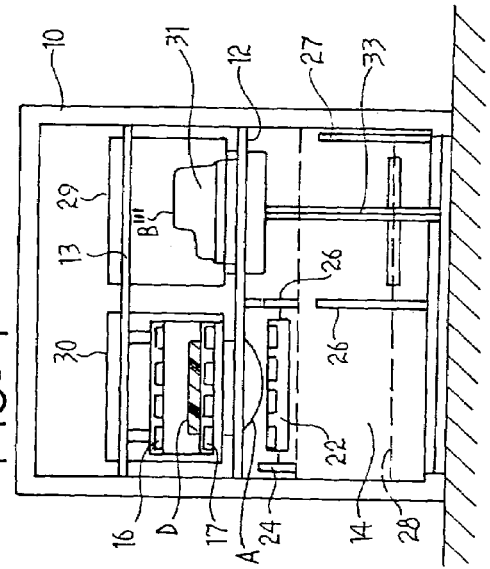
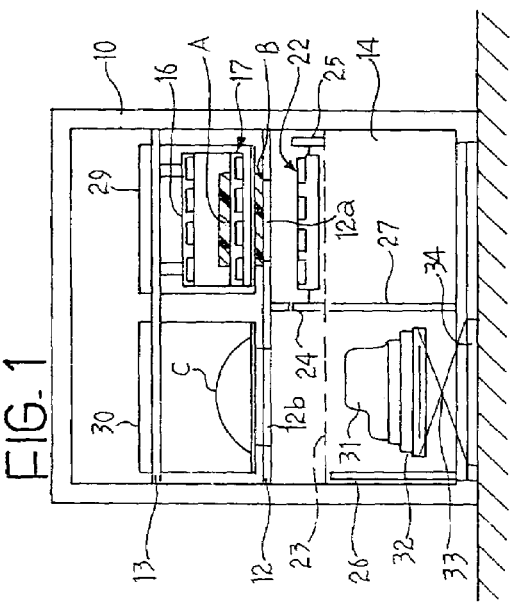
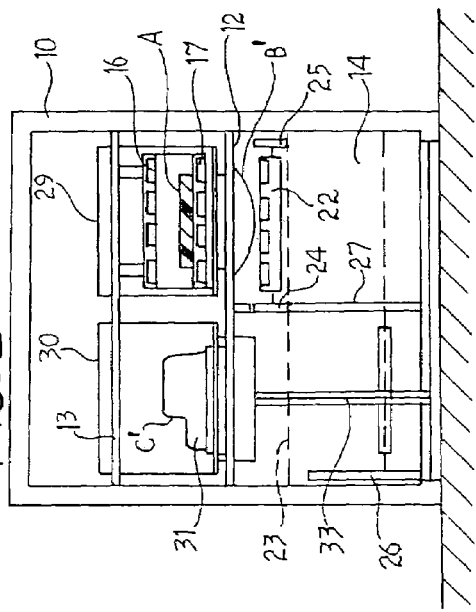

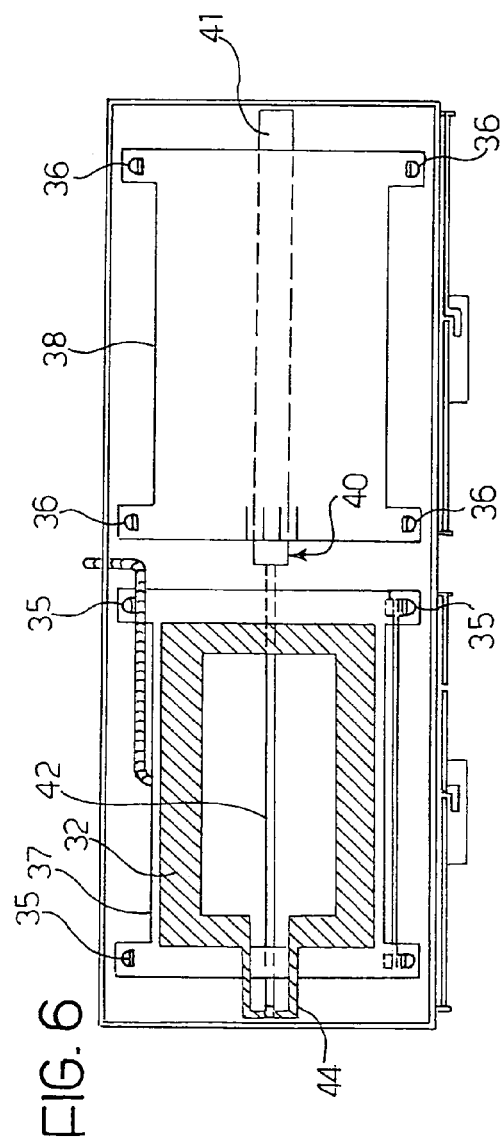
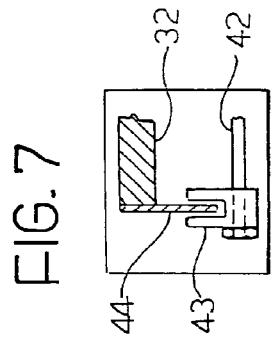
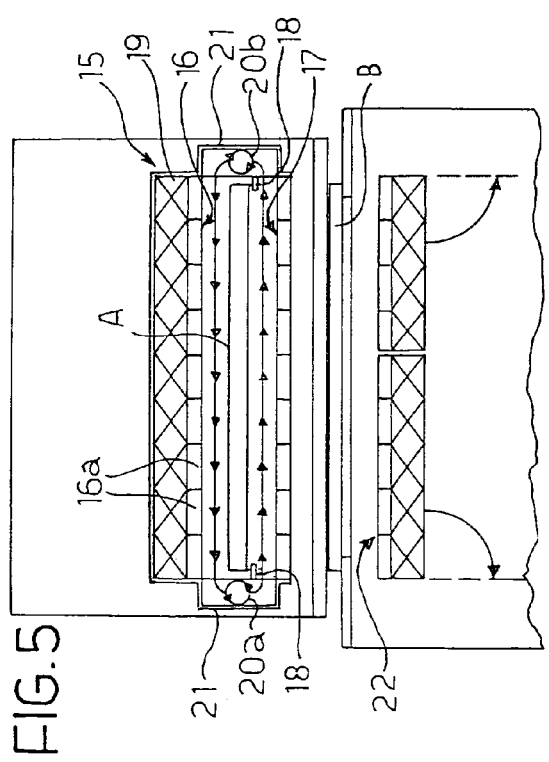

SINGLE STATION THERMO-FORMING MACHINE

BACKGROUND OF THE INVENTION

The present invention relates to a single station thermo-forming machine for forming three-dimensional work pieces, which have extensive surfaces but are relatively thin and of even thickness, from flat sheets or plates of thermoplastic material. The invention relates more particularly to a thermo-forming machine for vacuum forming.

In the prior art, an operator loads a sheet of thermoplastic material to be formed into a conventional single-station thermo-forming machine where a radiant heating panel heats it to a temperature at which the material is in a resilient plastic state. Once it has been heated and softened, the sheet is stretched by compressed air supplied from the base of the machine by means of a solenoid valve. A mould is raised and a vacuum is used to cause the stretched sheet to adhere to it. The thermo-formed work piece is then cooled using air and vaporised water and then unloaded by the operator. The production capacity of a standard single station block thermo-forming machine is in the region of 40 work pieces per hour if the sheets are around 4 mm thick. Machines of this type are subject to the following limitations:

heating is provided by only two heating panels, an upper one and a lower one;

it is impossible to heat the sheet and carry out the thermo-forming simultaneously;

only about 60% of the overall electric power supplied to the machine is actually used since during the thermo-forming step the radiant panels are powered but are not heating a sheet.

Thermo-forming machines with a very high productivity, known as in-line thermo-forming machines are also known in the industry. These machines are made up of five stations:

a first station where the cold sheet is loaded onto a conveyor system;

a second, pre-heating, station with an upper and a lower panel for pre-heating the sheet;

a third, final heating station with an upper panel and a lower panel;

a fourth station for vacuum forming the sheet in a mould; and a fifth station for trimming and unloading the formed work piece.

Although in-line thermo-forming machines have a high productivity and make use of 100% of the electricity supplied for heating the sheets, they are expensive, take up a lot of space, require several operators and also involve problems in transporting the sheets, which are conveyed by a chain and roller system which grips two opposite edges of the sheets.

SUMMARY OF THE INVENTION

The object of the present invention is therefore to provide a single station thermo-forming machine which solves the main problem of optimizing the energy used to preheat and heat the sheets. An additional object of the invention is to provide a thermo-forming machine which takes up less space, is inexpensive to manufacture and economical to run since it requires only one operator.

These and other objects and advantages, which will be better appreciated from the description, are achieved according to the invention by providing a single station thermo-forming machine the characteristics of which are defined in the following Claims.

BRIEF DESCRIPTION THE DRAWINGS

The structural and operating characteristics of a few preferred but non-limitative embodiments of a thermo-forming machine of the invention will now be described with reference to the attached drawings, in which:

FIGS. 1-4 are respective schematic elevation views of a first embodiment of a machine according to the invention in four different operating steps;

FIG. 5 is an enlarged view of the heating and preheating panels of the machine;

FIG. 6 is a schematic plan view illustrating an alternative lifting device to that shown in FIGS. 1-4;

FIG. 7 illustrates a detail of FIG. 6, enlarged and vertically sectioned; and

DETAILED DESCRIPTION OF THE INVENTION

Figure 8:
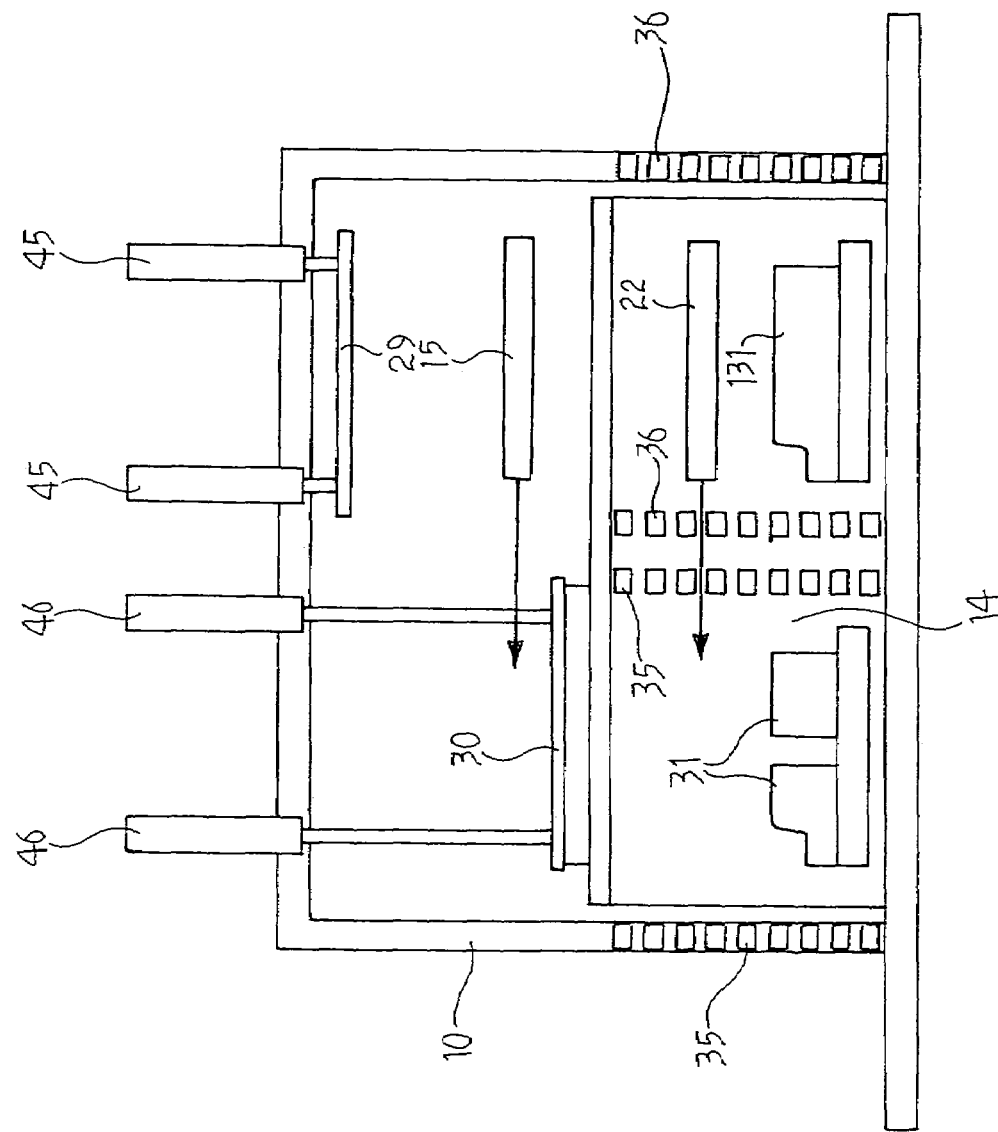
FIG. 8 is a schematic perspective view of a second embodiment of the machine of the invention.

With reference initially to FIGS. 1-4, a thermo-forming machine includes an outer casing 10 with left and right adjacent internal sections defined therein. The casing is divided into an upper portion and a lower portion 14 (called chamber) by a horizontal fixed apertured frame 12 known in the art as a "reduction plate". Air over-pressure can be achieved in the airtight chamber 14 by means of a solenoid valve, which is not shown.

Horizontal guides 13 (only one of which is shown) are arranged in the upper portion of the machine for supporting and guiding the horizontal translation of an upper heating and preheating assembly, generally indicated 15 and illustrated in more detail in FIG. 5.

The upper assembly 15 includes an upper preheating panel 16 and an intermediate panel 17 with a double series of ceramic electrical resistances 16a, 17a arranged respectively above and below a first sheet A of a plastics material to be preheated and which is supported around its edges by a perimetral flange 18. The intermediate panel 17, as will be explained later, simultaneously preheats the first sheet A and heats a second sheet B, which it has already preheated and which rests on the reduction plate 12. A thermal insulation layer 19 is positioned over and in contact with the resistors of the upper preheating panel 16.

In order to heat the plastics sheet A evenly during the preheating step, two respective ventilation devices 20a, 20b are provided at opposite ends of the panels 16 and 17 for encouraging the circulation of hot air around the sheet A, as shown by the arrows of FIG. 5. To this end, a vertical perimeter wall 21 laterally encloses the space around the sheet A during the preheating step.

As mentioned earlier, an important characteristic of the arrangement of the present invention consists in the fact that the heat emitted by the intermediate panel 17 is not only used to preheat the sheet A but simultaneously to heat the sheet B (which has already been preheated) from above as it rests on the reduction plate 12. At the same time, this sheet B is heated from below by a lower heating panel 22 arranged beneath the reduction plate 12 and coated on its underside with a thermal insulation layer 23. It is preferable if the lower panel 22 is divided into two asymmetrical portions mounted pivotably, in a configuration known in the art.

The lower heating panel 22 is mounted for horizontal translation along guides schematically indicated 23 between the right and left hand sections inside the machine (FIGS. 1-4) and is connected by its opposite ends to two vertical wall portions 24, 25 able to cooperate alternately with one of the lower vertical partitions 26, 27 described below. During the preheating step, a vertically translatable upper right hand counter-frame 29 retains the perimetral portion of the sheet B supported in a stable position on the reduction plate 12, over an opening 12a therein.

With reference again to FIG. 1, a vertically translatable upper left hand counter-frame 30 is shown in the upper portion of the left hand section of the machine for holding the perimeter portion of a sheet C supported in a stable position on the reduction plate 12, over an aperture 12b therein. The sheet C, which has already been preheated and heated in the preheating and heating stations, takes on an upwardly rounded configuration (known as a "balloon" configuration) as a result of the air overpressure in the left hand portion of the chamber.

Still with reference to FIG. 1, a thermo-forming mould 31 is supported in the left hand section of the chamber by a frame 32 which can be raised vertically by a pantograph lifting mechanism 33. In FIG. 1 this mechanism is shown in a retracted or lowered position. The lifting mechanism rests on a base 34 translatable from left to right and vice-versa under the action of a fluid pressure actuator (not shown in FIGS. 1-4). The translatable base 34 carries the vertical partitions 26, 27 which are arranged on opposite sides of the lifting mechanism 33.

Both the mould 31 and the heat-radiating elements constituting the panels 16, 17 and 22 are known in the art and do not need to be described in detail here.

The surface of the mould 31 has a plurality of microperforations connected to a vacuum source (not shown) enabling air to be sucked downwards through the mould. In the example described and illustrated here, the mould 31 is of a "positive" type. Reference to this type of mould should of course not be seen as in any way limiting the invention, which can also be applied to "negative" moulds.

The operation of the thermo-forming machine illustrated in FIGS. 1-4 will be described next; the cycle of sequential steps to which a sheet is subject during thermo-forming will be described first, followed by a description of the various steps which are carried out simultaneously on a plurality of sheets being processed in the same thermo-forming machine.

As shown in FIG. 1, a first, initially cold flat sheet of a plastics material is arranged in the position indicated A between the upper panel 16 and the intermediate panel 17 of the upper assembly 15 and preheated to a predetermined temperature. During this step, the heating panels 16, 17 and 22 are in the right hand section of the machine.

Once the sheet has been preheated, an operator takes it and rests it on the reduction plate 12, over the aperture 12a, in a position indicted B in FIG. 1. Here, the sheet is heated from above by the intermediate panel 17 and from below by the lower panel 22. The sheet, held around its edges by the right hand counter-frame 29, softens and takes on the downwardly rounded configuration indicated B' in FIG. 2.

A photoelectric cell (not shown), arranged just above the lower heating panel 22, automatically activates a solenoid valve (not shown) arranged in the right hand section of the chamber for introducing compressed air at a pressure which is relatively low (at around 0.2-0.5 bar) but enough to support the sheet, stopping its deformation sufficiently to prevent contact between the softened sheet B' and the resistors of the lower heating panel 22. During this step, the softened sheet is in a condition known in the art as floating. In this position (see FIG. 2) the vertical wall 24 is vertically aligned with and sealingly engages the partition 27 so as to maintain the required pressure in the right hand section of the chamber.

The heating step can be ended when an optical temperature detector (not shown) indicates that a predetermined softening temperature has been reached; alternatively, instead of measuring the temperature, the heating step can be terminated automatically at the end of a set period of heating.

Once the correct degree of softening has been achieved, the heating panels 16, 17 and 22 are moved together along the guides 13 and 23 from the right hand to the left hand section of the machine, while the mould 31 and its lifting mechanism 33 are moved from the left hand section to the right hand section of the chamber, in vertical alignment with the aperture 12a around which the right counter-frame 29 still holds the softened sheet. In this position (see FIG. 3) the vertical partition 26 is aligned with and engages the vertical wall 25 secured to the lower heating panel 22.

At this point, a solenoid valve is controlled to supply compressed air into the right hand section of the chamber at a pressure of around 2-2.5 bar, thereby giving the softened sheet the upwardly rounded (balloon) configuration, indicated B" in FIG. 3, ready to receive the mould 31. An additional photoelectric cell (not shown) is provided in a higher position to that of the reduction plate and connected to the solenoid valve for limiting automatically the input of compressed air and thus the upward deformation of the balloon B".

By controlling the extension of the pantograph mechanism 33, the mould 31 is then raised through the aperture 12a into contact with the balloon B" which is further stretched and, as a result of the suction though the microperforations in the mould, caused to adhere to the mould and adopt its three dimensional shape (as indicated B''' in FIG. 4).

The subsequent step of cooling and solidifying the work piece is controlled by fans (not shown) which blow air at ambient temperature over the outer surface of the formed work piece on the mould.

In order to make it easier to detach the work piece from the mould, air at around 6 bar is injected through the microperforations in the mould. The mould is lowered at the same time, first by lowering the lifting mechanism 33 so that the downward movement starts very slowly, ensuring that the work piece comes away smoothly and avoiding the so-called ventouse effect which could deform the newly-formed work piece. Once there is a gap of a few centimeters between the mould and the work piece (which is supported round its edges by the reduction plate), the mould can be lowered more rapidly. The thermo-formed work piece is then removed from the machine.

With reference now to the overall operation of the machine, it will be seen from FIG. 1 that while a first sheet A is being preheated and a second sheet B is being heated in the right hand section of the machine, a third sheet C which has already been preheated and heated is taking on the "balloon" configuration under the effect of the compressed air introduced into the left hand section of the chamber by a further solenoid valve in communication with this chamber.

In FIG. 2, while the first sheet A undergoes preheating and the second sheet B' is heated and supported in a floating condition, the third sheet C' is shaped by the mould 31 which has been raised.

In FIG. 3, the heating and preheating panels are in the right hand section; the heat-formed work piece obtained from the third sheet C' has been removed from the mould, which has been shifted to the right hand section in order to mould the second sheet B" (in the balloon condition). The horizontal guide and movement means for the mould frame 32 are schematically indicated 28. A new (fourth) sheet D undergoing the preheating step has been introduced between the upper preheating panel 16 and the intermediate panel 17, while the sheet A which has just been preheated is positioned between the panels 17 and 22 in order to be heated.

In FIG. 4, the second sheet B is being formed in the right hand section of the machine, while in the left hand section the fourth sheet D is still being preheated and the first, heated sheet A is now in the floating configuration.

FIGS. 6 and 7 schematically illustrate an alternative mould-shifting system to that shown in FIGS. 1-4. In FIG. 6 the left hand and right hand sections of the chamber each have a vertical rack lifting mechanism, indicated 35, 36 along which two horizontal plates, indicated 37 and 38 respectively translate vertically. A horizontal fluid pressure actuator 40 arranged at floor level includes a cylinder 41 fixed to a stationary part of the machine and an extendable piston with a rod 42 bearing a U-shaped hook element 43 at one end (see FIG. 7) for engaging a vertical element projecting from the bottom of the mould frame 32. In order to move the mould between the left and right hand sections, the two horizontal supports are lowered to the bottom of their respective racks, aligned in the same horizontal plane. By controlling the retraction or extension of the fluid pressure actuator 40, the frame 32 of the mould is moved sideways from one support to the other. When the support carrying the mould is lifted, the element 44 disengages from the hook 43.

The embodiment of the machine of the invention shown in FIG. 8 differs from that of FIGS. 1-4 in that two moulds 31 and 131 (instead of only one) are provided, arranged one in the left and one in the right hand section of the machine. These moulds have associated members, such as racks 35, 36, for moving them vertically but not horizontally. The heating and preheating panels are instead translatable horizontally as in the variant of FIGS. 1-4. Pneumatic actuators for moving the counter-frames 29 and 30 vertically are indicated 45 and 46. The advantage of the variant of FIG. 8 is that a single station thermo-forming machine can produce two differently shaped three-dimensional work pieces, of similar overall dimensions, simultaneously, such as the body and door of a refrigerator, for example.

It is intended that the invention shall not be limited to the embodiments described and illustrated here, which should be considered only as non-limitative examples of the thermo-forming machine; the invention is, however, susceptible of modifications to the shape and arrangement of parts, as well as construction and operating details, as will be clear to those skilled in the art.

What is claimed is:

1. A thermo-forming machine for forming three-dimensional work pieces with large surfaces and a relatively thin and uniform thickness from flat sheets of a thermoplastic material, the machine comprising:
   at least one mould (31, 131) movable vertically between a passive lowered position and a raised forming position,
   a lower pressurizable chamber (14) delimited at the top by a horizontal reduction plate (12) with a first and a second aperture (12a, 12b), spaced horizontally and of a size to allow the said mould (31, 131) to pass through them,
   a first and a second counter-frame (29, 30) for each holding a sheet to be formed around the said apertures (12a, 12b) in the reduction plate (12),
   three heating panels (16, 17, 22) vertically aligned and spaced from one another and movable horizontally between a first position aligned vertically with the first aperture (12a) and a second position aligned vertically with the second aperture (12b),
   wherein an upper heating panel (16) and an intermediate heating panel (17) are disposed above the reduction plate (12) for preheating opposite surfaces of a flat sheet supported between these two panels (16, 17),
   and a lower heating panel (22) is disposed beneath the reduction plate (12) for simultaneously heating from below another sheet held around one of the said apertures and heated from above by the intermediate panel (17).

2. The machine of claim 1, wherein the upper panel (16) and the intermediate panel (17) form part of an upper heating assembly (15) translatable as a unit along guide means (13) above the reduction plate (12).

3. The machine of claim 2, wherein the upper heating assembly (15) includes a perimetral flange (18) able to support the edges of the sheet suspended between the upper panel (16) and the intermediate panel (17).

4. The machine of claim 1, including a single mould (31) movable vertically and horizontally within the chamber between a first position aligned vertically with the first aperture (12a) and a second position aligned vertically with the second aperture (12b).

5. The machine of claim 4, wherein the mould is translatable horizontally secured to two spaced vertical and parallel partitions (26, 27) in such a way that when the mould (31) is in one of the positions aligned vertically with either of the apertures (12a, 12b), one of the two vertical partitions (26 or 27) cooperates sealingly with one (24 or 25) of two vertical walls (24, 25) positioned at opposite ends of the lower heating panel (22) so as to maintain different pressures in the two compartments of the chamber (14) delimited by these cooperating sealing elements (24 and 27 or 25 and 26).

6. The machine of claim 1, including two moulds (31, 131) each movable vertically in vertical alignment with one (12a or 12b) of the apertures in the reduction plate (12).

7. The machine of claim 6, wherein the two moulds (31, 131) are shaped differently.

* * * * *